United States Patent [19]

Baumann

[11] Patent Number: 4,754,823

[45] Date of Patent: Jul. 5, 1988

[54] CAPACITIVE POSITION SENSING MEANS FOR WEIGHING APPARATUS OF THE ELECTROMAGNETIC LOAD COMPENSATION TYPE

[75] Inventor: Arthur Baumann, Bertschikon, Switzerland

[73] Assignee: Mettler Instrumente AG, Greifensee, Switzerland

[21] Appl. No.: 60,823

[22] Filed: Jun. 12, 1987

[30] Foreign Application Priority Data

Jan. 7, 1986 [CH] Switzerland .................. 02645/86

[51] Int. Cl.$^4$ ..................... G01G 7/00; G01G 3/14
[52] U.S. Cl. ........................... 177/212; 177/210 C
[58] Field of Search .................. 177/212, 210 EM

[56] References Cited

U.S. PATENT DOCUMENTS

| | | | |
|---|---|---|---|
| 2,734,736 | 2/1956 | Payne | 177/212 X |
| 3,604,525 | 9/1971 | Blethen et al. | 177/212 X |
| 3,677,357 | 7/1972 | Baumgartner | 177/212 X |
| 3,986,571 | 10/1976 | Strobel et al. | |
| 4,034,819 | 7/1977 | Akers et al. | |
| 4,062,417 | 12/1977 | Kunz | |
| 4,099,587 | 7/1978 | Kaufmann | |
| 4,170,269 | 10/1979 | Kunz | |
| 4,494,620 | 1/1985 | Knothe et al. | 177/212 X |
| 4,503,923 | 3/1985 | Maaz | |
| 4,572,006 | 2/1986 | Wolfendale | |

FOREIGN PATENT DOCUMENTS 2609130 9/1977 Fed. Rep. of Germany .

Primary Examiner—George H. Miller, Jr.
Attorney, Agent, or Firm—Laubscher & Laubscher

[57] ABSTRACT

Weighing apparatus of the electromagnetic load compensation type includes an improved variable ($C_x$) and reference ($C_o$) capacitance comparison arrangement for sensing the position of the movable load receiver member relative to the stationary base member. The comparison arrangement supplies an error signal that is proportional to the capacity ratio, which error is used to control a compensation current ($i_L$) that is supplied to a compensation coil to maintain the movable load receiver member at its initial zero position. The variable capacitance is produced by a variable air capacitor including a first pair of stationary capacitor plate electrodes (10, 12), and a movable plate-like metal shield or screen which extends partially between the first pair of electrodes in accordance with movement of the load receiver member.

The position sensor arrangement is simple to construct and install, and affords precise measurement during use. All of the plate-like capacitor electrodes are stationary, and can be mounted in the immediate vicinity of the error signal generator.

6 Claims, 2 Drawing Sheets

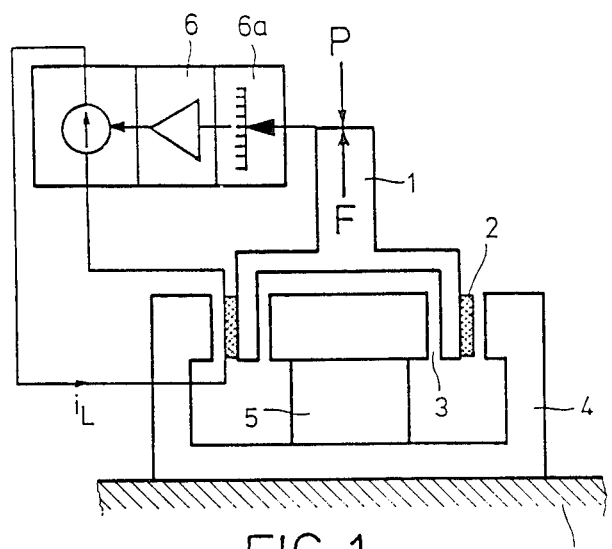
FIG. 1
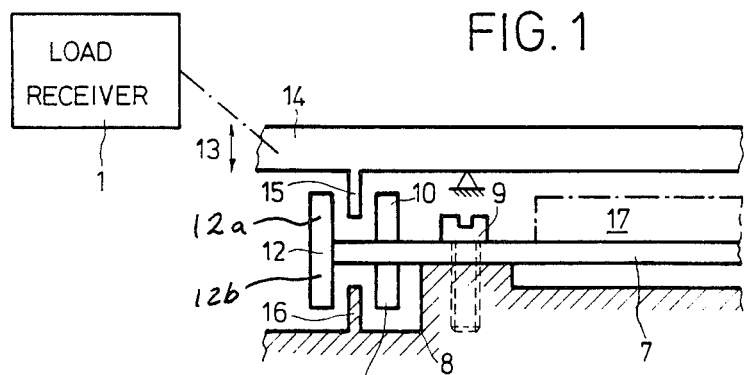
FIG. 2
FIG. 3

CAPACITIVE POSITION SENSING MEANS FOR WEIGHING APPARATUS OF THE ELECTROMAGNETIC LOAD COMPENSATION TYPE

BRIEF DESCRIPTION OF THE PRIOR ART

This invention relates to a capacitive position sensing arrangement for use in connection with weighing apparatus of the electromagnetic load compensation type. A variable air capacitor is provided having a first pair of stationary parallel spaced capacitor plates, the capacity between the plates being varied by a movable metal screen or shield that extends partially therebetween and is connected for movement by the load receiving member. The variable capacitance is compared with a reference capacitance by comparison means that generates an error signal which controls the compensation current that is supplied to the compensation coil to maintain the load receiver member in its initial zero position, the magnitude of this compensation current being a measure of the load being weighed.

The use of variable capacity position sensing means in weighing apparatus of the electromagnetic load-compensation type is known in the art, as evidenced, for example, by the prior U.S. patents to Strobel et al U.S. Pat. Nos. 3,986,571, Kunz 4,062,417 and 4,170,269, and Kaufmann 4,099,587, each assigned to the same assignee as the present invention.

Such a capacitive type position detector is further known from U.S. Pat. No. 4,034,819, where both capacitors are variable and are formed by a pair of axially relatively shiftable annular electrodes. These annular electrodes are arranged inside the closed electromagnetic system for load compensation, specifically, there being provided two annular electrodes along the inside wall of the fixed magnet system and, opposite it, there are arranged a pair of annular electrodes on the movable coil body which carries the coil through which flows the compensation current and which, owing to the effect of the load to be weighed, is moved axially. The annular electrodes are so arranged that, if the coil body moves, the capacity of one capacitor will increase while the capacity of the other capacitor will decrease simultaneously. The two movable annular electrodes are connected with each other electrically so that the two capacitors of this detector element form a differential capacitor. For the compensation of erroneous capacity changes, which, for example, occur owing to the heat expansion of the coil body or if the latter is tilted, there are provided two such detector elements which are arranged in axially spaced relation on both sides of the coil and which are electrically connected in parallel. Connecting lines run from the detector element pair to the electrical capacitance comparison circuit which is arranged outside the weighing cell.

This known position detector has the inherent disadvantage that it requires a relatively major effort in terms of design and manufacture. Inaccuracies during manufacture lead to deviations of the individual capacities from their nominal values, and this means that the balance position of several scales in a particular construction series will lie within a vertical scatter range that exceeds permissible limits with respect to the movement of the load receiver of the scale. This is why adjusting means are necessary which make it possible to coordinate the movement range of the load receiver with the electrically determined balance position. Other disadvantages are the electrical connecting lines, which are present between the detector elements and the analyzing device that is separated from the former; they can form scatter capacities with an influence upon the balance position which varies from one scale to the next. Besides, as a result of the antenna effect, high-frequency interference signals can get into the electrical analyzing system if these connecting lines are not sufficiently screened.

The present invention was developed to provide a capacitive position detector which—while avoiding the previously mentioned disadvantages—will facilitate a simpler mechanical structure and a more precise operation manner.

SUMMARY OF THE INVENTION

Accordingly, a primary object of the present invention is to provide improved variable-capacitance-type position sensing means for use in detecting the displacement of the load receiving member of electromagnetic load-compensation weighing apparatus from its initial zero position. Comparison circuit means responsive to the ratio between the variable capacitance and a fixed reference capacitance generate an error voltage that controls the compensation current for maintaining the load receiver member in its initial zero position, the magnitude of this compensation current being a measure of the weight applied to the load receiving member.

According to a more specific object of the invention, the variable capacity means comprise an air capacitor including a first pair of parallel spaced plate-like electrodes mounted in stationary relation relative to the instrument frame, and a movable metal screen or shield that is connected with the movable load receiver to extend in the space between the first pair of electrodes to vary the capacitance thereof. A fixed reference capacitance is produced by a second pair of stationary parallel spaced plate-like electrodes between which partially extends a stationary screen or shield. A comparison circuit produces an error signal of one polarity when the reference capacity is greater than the variable capacity, and of the other polarity when the reference capacity is less than the variable capacity.

The position detector according to the present invention is characterized by the fact that the variable air capacitor includes two fixed plane-parallel plate-like electrodes that lie in planes parallel with the direction of movement of the movable member, that, furthermore, the movable member is a vane, shield or screen consisting of metal, which protrudes at least partially into the space between the parallel plate-like electrodes and which partly screens the electrodes against each other, and that the means affording a reference capacity is a fixed capacitor.

The position detector according to the invention has one capacitor with variable capacity and one capacitor with fixed capacity, in contrast to the differential capacitor with two capacities that can be altered in opposite directions with respect to each other. The sensitivity loss, which is accepted by this simplification, however, can be compensated for without any problems by a suitable signal amplification. The advantage connected with that on the other hand consists in the fact that the variation of the capacity can be performed in a simple manner by means of a screen that extends between the spaced capacitor electrodes. The application of this basic principle in a differential capacitor would lead to an expensive design that would make it more difficult to install the detector element. The basically known principle of a variable capacitor with electrodes that are screened against each other by means of a movable vane simplifies the structure and assembly of the detector element because the maintenance of a predetermined electrode interval in a capacitor with two fixed plane-parallel service electrodes does not present any difficulties and because the particular capacity in each case depends on the depth to which the vane extends between the electrode, while a lateral displacement of the vane within certain limits has practically no effect. External interference factors (for example, temperature fluctuation) thus have a far less intensive effect than in the case of a capacitor with a movable electrode whose predetermined interval with respect to the fixed electrode is more difficult to maintain because the movable scale components that carry the movable electrodes determine the electrode interval and thus the capacity. This circumstance on the one hand calls for particularly high precision in the manufacture and assembly of these structural components. On the other hand, the inclusion of these movable structural components increasingly also brings out external interference factors in terms of their influence on the capacity.

A preferred version of the position detector according to the invention consists in the fact that the screen or shield is formed by a vane which extends orthogonally from a scale beam. This solution yields a greater degree of freedom with respect to the placement of the position detector inside the scale than in the known design and does not require any double execution of the detector element. Furthermore, one can eliminate means for the adjustment of the load receiver to the electrically determined balance position because, in this simple design of the detector element, there are no problems regarding precision in the manufacture and assembly [installation] and because external interference factors exert less influence.

The two capacitors that constitute the detector element are preferably arranged on a plate-like circuit carrier or printed circuit board which is attached to a fixed part of the scale and which at the same time carries the electrical analyzing circuit. In this way, the detector element can be arranged in the immediate vicinity of the analyzing device so that the connecting lines between the detector element and the analyzing device can be kept extremely short. Scatter capacities and foreign signal coupling can thus be reduced to a negligible degree.

The fixed condenser can be suitably included in the circuit arrangement of the electrical analyzing device, for example, it can be integrated into an IC building block. Better compensation against environmental factors (temperature, humidity) on the other hand can be achieved with a solution in which the flat electrodes of the variable air capacitor are built up on one side of the circuit carrier while the fixed capacitor is formed as an identical air condenser with two plane-parallel flat electrodes, between which partially extends a fixed screen made of metal. An arrangement that is particularly practical in this respect consists in the fact that the plate-like capacitor electrodes on the other side of the circuit carrier are symmetrically arranged with respect to the flat electrodes of the variable air capacitor and that the shield of the fixed capacitor is formed by a vane which extends orthogonally at the fixed part of the scale. The extent of temperature changes, which can have an effect on the electrode interval and the dipping depth of the screen, is practically the same in both capacitors based on this design so that the balance position is not influenced by this and so that deviation errors can be avoided.

BRIEF DESCRIPTION OF THE DRAWINGS

Other objects and advantages of the invention will become apparent from a study of the following specification, when viewed in the light of the accompanying drawings, in which:

FIG. 1 is a block diagram of the electromagnetic load compensation weighing apparatus in connection with which the variable capacity position sensing means of the present invention is utilized;

FIG. 2 is a detailed view of the variable capacity position sensing means of the present invention;

FIG. 3 is a diagrammatic representation of the operation of the variable and reference capacity devices and the comparison means for producing an error signal.

DETAILED DESCRIPTION

Figure 4:
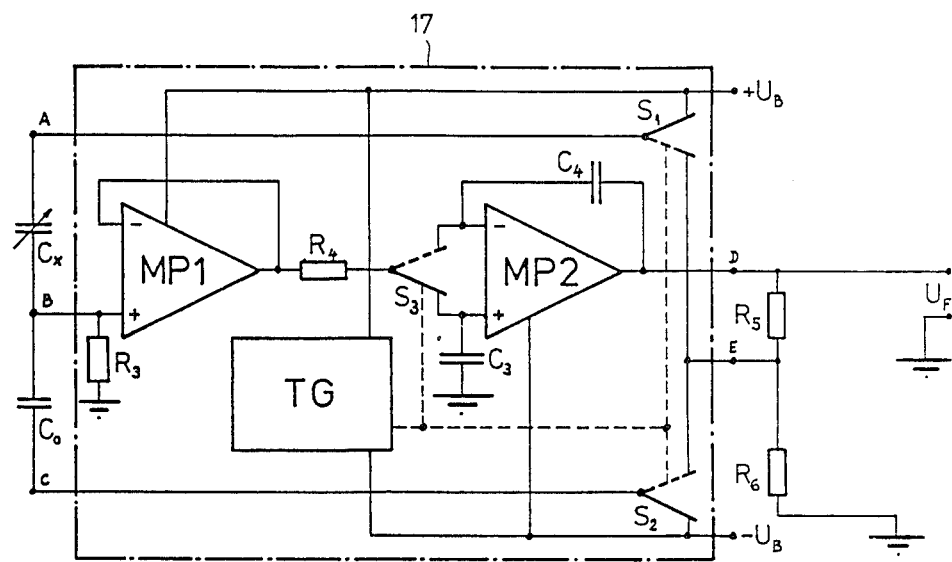
FIG. 4. is an electrical schematic of the capacity and comparison means of FIG. 3.

Referring now more particularly to FIG. 1, the weighing apparatus includes a movable load receiver 1 to which is applied a force P that corresponds with the weight of the object to be weighed. Load receiver 1 carries a load-compenstion coil 2 which is arranged in the air gap of a permanent magnet system 4 having a permanent magnet 5. Through the load winding of coil 2 flows a compensation current $i_L$ which, in the magnetic field of the permanent magnet system 4, generates a force F that works against the force P of the object to be weighed. By means of current regulating means 6, which includes a position detector 6a for sensing the position of load receiver 1, the compensation current $i_L$ is so regulated that the force F, which is proportional to it, will keep the scale in balance and that the magnitude of the compensation current $i_L$ thus represents a measure of force P or of the weight of the object to be weighed.

Referring now to FIG. 2, the capacitive position sensing means of the present invention includes a plate-like circuit carrier or circuit board 7 that is mounted on the stationary base 8, for example, by mounting screw 9. A first pair of stationary plate electrodes 10 and 12a (upper part of plate 12) extend orthogonally is parallel spaced relation from one side of the circuit board to define an air capacitor, these electrodes being parallel with the direction of movement 13 of the conventional movably mounted scale beam member 14 that is connected at one end with the load receiver 1. A second pair of capacity plates 11 and 12b (lower part of plate 12) extend orthogonally in parallel spaced relation from the other side of the circuit board 7, these plates also being parallel to the direction of movement 13 of the scale beam member. A metal shield or screen 15 extends orthogonally from the movable scale beam 14 partially within the space between the first pair of electrodes, and a second shield or screen 16 extends from the base 8 into the space defined between the reference capacity electrodes 11 and 12. The capacities $C_x$ and $C_o$ of the variable and reference air capacitors are determined on the one hand, by the geometrical data of the surface electrodes 10, 11, 12a and 12b, and, on the other hand, by metal shields or screens 15 and 16 which protrude into the spaces between the planar electrodes 10 and 12a, and between 11 and 12b, respectively, and which partially screen the associated planar electrodes against each other. Shield 15 is formed by a vane that projects orthogonally outwardly from the scale beam 14, while screen 16 is formed by a vane that projects orthogonally from base member 8. Capacitor 10, 12a, and 15 thus has a variable capacity $C_x$ whose magnitude is in a linear relationship with the displacement of the scale beam 14, and the capacitor 11, 12b, and 16 forms the fixed reference capacity $C_o$. The planar electrodes 10, 11, and 12 are connected by means of short connecting leads (FIG. 3) with the electrical capacity comparison circuit 17 that is located at the other end of circuit carrier 7 and that produces an error signal $U_F$ that regulates the compensation current $i_L$ of the scale in such a manner that the scale will come into balance when the capacity $C_x$ of the variable capacitor reaches the same value as the capacity $C_o$ of the reference capacitor.

A practical circuit arrangement of the electrical analyzing circuit 17 for the generation of the error signal $U_F$ is illustrated in FIG. 4.

To operate the evaluation device 17, a pair of ground-symmetrical direct-current voltages $+U_B$ and $-U_B$ are supplied. To supply the capacitors $C_x$ and $C_o$, these direct voltages are chopped by means of two periodically activated electronic selector switches $S_1$ and $S_2$. The voltage at the center point B of the capacitive bridge arrangement is supplied to a first operational amplifier MP1 which operates as an impedance converter with a high input resistance whose working point is determined by the resistance $R_3$ at its noninverted input. A phase-selective rectifier circuit comprises a second operating amplifier MP2 which is connected as a double integrator with capacitors $C_3$ and $C_4$, and a third electronic selector switch $S_3$ via which the signal, supplied by the first operating amplifier MP1, and coupled via resistor $R_4$, is alternately supplied to the both inputs of the second operating amplifier MP2. The control signal inputs of all three selector switches $S_1$ and $S_2$, and $S_3$ are connected to a common clock generator TG whose beat frequency, for example, is 30 kHz. At the output of the operating amplifier MP2 originates the error signal $U_F$ in the form of a direct-current voltage which, for example, in case of $C_x < C_o$ is negative and in case of $C_x > C_o$ is positive. The attainable absolute magnitude of the error signal $U_F$ as a function of the change of the capacity ratio $C_x/C_o$ depends on the degree of feedback which is achieved by the connection between the connecting points D and E at the output of the analyzing circuit 17. In the present case, a part of the error signal $U_F$ is fed back with the help of the voltage divider R5, R6. More intensive feedback, for example, a direct connection between the connecting points D and E, will reduce the error signal $U_F$ and vice versa.

Preferably, not only is the electrical comparison circuit 17 but also the entire regulating device 6 (FIG. 1) of the scale mounted on the same circuit board 7. In this way, one can further reduce the initially mentioned error sources which result from the otherwise required intermediate lines.

What is claimed is:

1. In a weighing apparatus of the electromagnetic load compensation type including a stationary permanent magnet system (4) mounted on a supporting base member (8), a load-receiving member (1) mounted for movement from a no-load zero position relative to said base member, a compensation current coil (2) connected with said load-receiving member for movement within the magnetic field of said permanent magnet system, means for generating an error signal ($U_F$) that is a function of the deviation of said load receiving member from said zero position, and compensating current generating means (6) for supplying to said compensation current coil a compensation current ($i_L$) the magnitude of which is a function of said error signal;

the improvement wherein said error signal generating means comprises:

(a) variable air capacitor means including a first pair of parallel plate-type capacitive electrodes (10, 12a) connected in fixed spaced relation with one of said load receiving and base members, said first pair of capacitive electrodes extending generally parallel with the direction of movement of said load receiving member, and a plate-like metal shield member (15) connected with the other of said load receiving and base members, said shield member being generally parallel with and extending partially in spaced relation between said first pair of electrodes, thereby to vary the capacitance ($C_x$) between said first pair of electrodes in accordance with the movement of said load-receiving member relative to said base member;

(b) reference capacitor means (11, 12b) for generating a reference capacitance ($C_o$) ; and (c) comparison circuit means (17) for generating said error signal ($U_f$) as a function of the capacitances of said variable and reference capacitor means.

2. Apparatus as defined in claim 1, and further including a scale beam (14) connected with said base member for movement by said load-receiving member, said shield member extending orthogonally from said scale beam.

3. Apparatus as defined in claim 1, and further including a planar carrier member (7) attached to said base member, said first pair of capacitive electrodes and said comparison circuit means being supported by said carrier member.

4. In a weighing apparatus of the electromagnetic load compensation type including a stationary permanent magnet system (4) mounted on a supporting base member (8), a load-receiving member (1) mounted for movement from a no-load zero position relative to said base member, a compensation current coil (2) connected with said load-receiving member for movement within the magnetic field of said permanent magnet system, means for generating an error signal ($U_F$) that is a function of the deviation of said load receiving member from said zero position, and compensating current generating means (6) for supplying to said compensation current coil a compensation current ($i_L$) the magnitude of which is a function of said error signal;

the improvement wherein said error signal generating means comprises:

(a) a planar carrier member (7) attached to said base member;

(b) variable air capacitor means including a first pair of parallel spaced plate-type capacitive electrodes (10, 12a) connected with, and extending orthogonally from one side of, said carrier member, said first pair of capacitive electrodes extending generally parallel with the direction of movement of said load receiving member, and a plate-like metal shield member (15) connected with said load receiving member, said shield member extending partially in parallel spaced relation between said first pair of electrodes, thereby to vary the capacitance ($C_x$) between said first pair of electrodes in accordance with the movement of said load-receiving member relative to sad base member;

(c) reference capacitance means for generating a reference cpacitance ($C_o$), said reference capacitance means including a second pair of parallel spaced plate-like electrodes (11,12b), and a second plate-like metal shield member (16) extending partially between said second pair of electrodes; and (d) comparison circuit means (17) for generating said error signal ($U_f$) as a function of the capacitances of said variable and reference capacitor means, said comparison circuit means being mounted on said carrier member.

5. Apparatus as defined in claim 4, wherein said second pair of electrodes is also mounted on, and extends normal to the other side of, said carrier member in symmetrical relation to said first pair of electrodes, and further wherein said second plate-like shield member is mounted on said base member.

6. In a weighing apparatus of the electromagnetic load compensation type including a stationary permanent magnet system (4) mounted on a supporting base member (8), a load-receiving member (1) mounted for movement from a no-load zero position relative to said base member, a compensation current coil (2) connected with said load-receiving member for movement within the magnetic field of said permanent magnet system, means for generating an error signal ($U_F$) that is a function of the deviation of said load receiving member from said zero position, and compensating current generating means (6) for suplying to said compensation current coil a compensation current ($i_L$) the magnitude of which is a function of said error signal;

the improvement wherein said error signal generating means comprises:

(a) variable air capacitor means including a first pair of parallel spaced plate-type capacitive electrodes (10, 12a) connected with one of said load receiving and base members, said first pair of capacitive electrodes extending generally parallel with the direction of movement of said load receiving member, and a plate-like metal shield member (15) connected with the other of said load receiving and base members, said shield member extending partially in parallel spaced relation between said first pair of electrodes, thereby to vary the capacitance ($C_x$) between said first pair of electrodes in accordance with the movement of said load-receiving member relative to said base member.

(b) reference capacitor means (11, 12b) for generating a reference capacitance ($C_o$); and (c) comparison circuit means (17) for generating said error signal ($U_f$) as a function of the capacitances of said variable and reference capacitor means, said comparison circuit means including:

(1) means connecting said reference and variable capacitors in series to define the capacitive branch of a bridge circuit;

(2) means including a pair of periodically operable selector switches ($S_1$, $S_2$) for applying a chopped direct-current voltage across said capacitive branch;

(3) first operational amplifier means (MP1) having an input connected with said capacitive branch at a point (B) between said fixed and variable capacitors, said first operational amplifier means serving as an impedance converter with a high input resistance;

(4) phase-sensitive rectifier circuit means including a second operational amplifier (MP2) having a pair of inputs connected with a pair of capacitors ($C_3$, $C_4$), respectively, to define a double integrator circuit, and a third selector swith ($S_3$) for alternately connecting said rectifier circuit inputs with the output of said first operational amplifier; and (5) impulse generator means (TG) for operating said selector switches at a given beat frequency, whereby the polarity of the error signal ($U_F$) appearing at the output of said second operational amplifier is a function of whether the variable capacitance is greater or smaller than the reference capacitance.

* * * * *

UNITED STATES PATENT AND TRADEMARK OFFICE
CERTIFICATE OF CORRECTION

PATENT NO. : 4,754,823

DATED : July 5, 1988

INVENTOR(S) : Arthur Baumann

It is certified that error appears in the above—identified patent and that said Letters Patent is hereby corrected as shown below:

In the Heading, correct the Foreign Application Priority Data to read:

July 1, 1986 [CH] Switzerland 02 645/86

Signed and Sealed this

Eighteenth Day of April, 1989

Attest:

DONALD J. QUIGG

*Attesting Officer*  *Commissioner of Patents and Trademarks*